Feb. 10, 1959    H. L. PARKER ET AL    2,873,408
LIGHT FLASH PRODUCING SYSTEM
Filed April 5, 1957
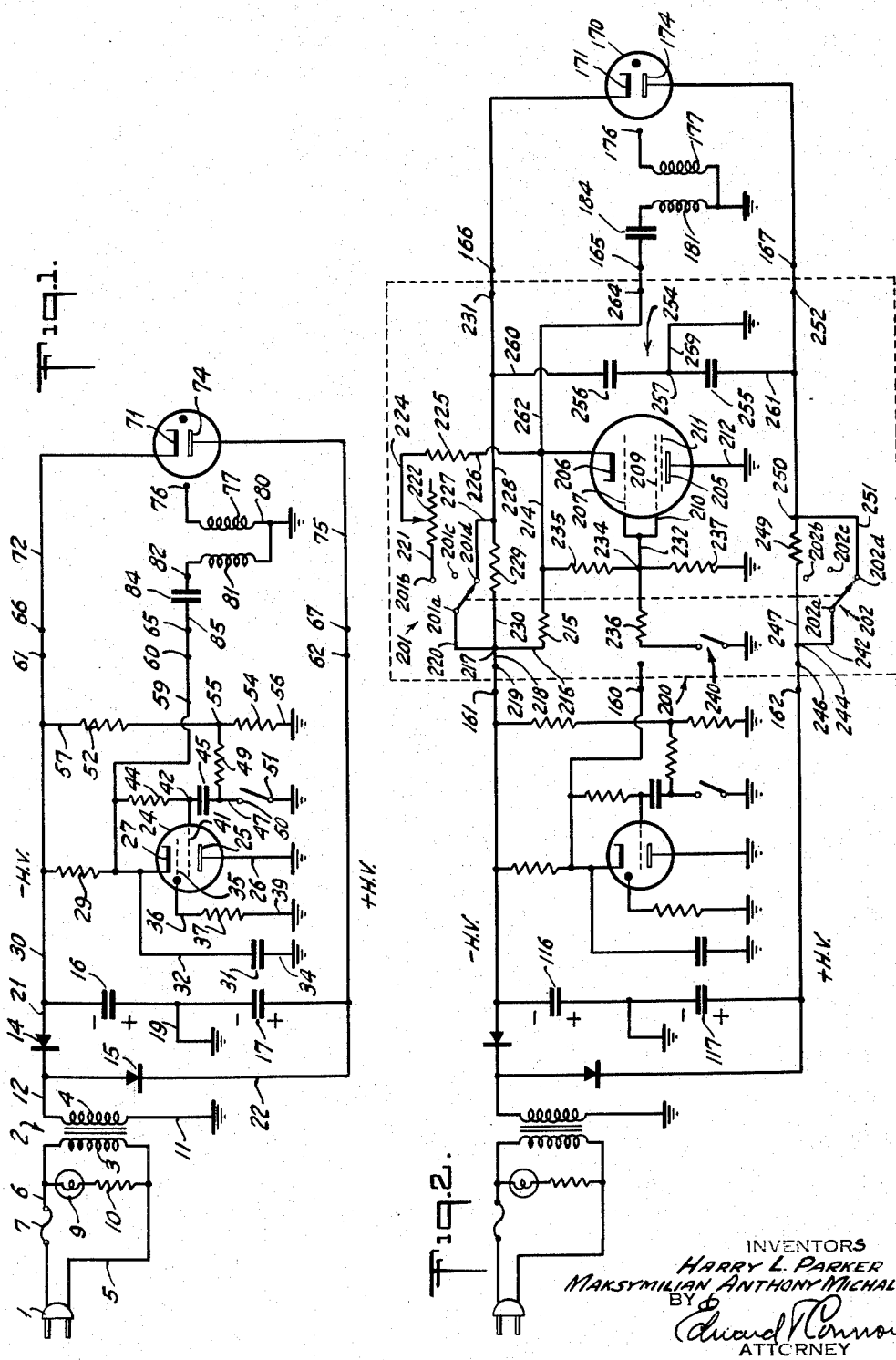
INVENTORS
*Harry L. Parker*
*Maksymilian Anthony Michalski*
BY
*Edward T. Connors*
ATTORNEY United States Patent Office 2,873,408
Patented Feb. 10, 1959

2,873,408

LIGHT FLASH PRODUCING SYSTEM

Harry L. Parker, St. Albans, and Maksymilian Anthony Michalski, Woodside, N. Y., assignors to American Speedlight Corporation, Middle Village, N. Y.

Application April 5, 1957, Serial No. 651,072

6 Claims. (Cl. 315—183)

The present invention relates to electrical systems and devices, and more particularly to apparatus in which light flashes are produced of a duration of less than one thousandths of a second, such as may be used, among other purposes, for flash photography.

In such devices, a gaseous discharge flash tube is used to produce a high intensity flash which illuminates the object to be photographed. In some cases it is desirable to observe the object being photographed so as to assure the correct focusing of the object and the positioning and focusing of the light. Heretofore, it has been the prior practice to use an incandescent lamp in or about the flash tube for modeling purposes.

In order to provide a unit which provides the facility of continuous viewing as well as a high power single flash, it is necessary that the unit be relatively inexpensive and it is a single purpose unit. Greater versatility is had when existing equipment is used and an adapter unit is provided for the purpose of critically adjusting the flash tube.

In photomicrography and other similar applications an extremely accurate adjustment of the flash light source may be necessary. Further, in some such cases it is necessary to view the subject in true color and without applying heat to the object.

The prior devices for adjusting the flash light have many disadvantages, perhaps the greatest being that the incandescent lamp used for observation purposes is physically at a different light center than that of the flash tube. Therefore, accurate alignment and focus of the high power flash is very difficult if not impossible. Another disadvantage of the prior devices is the comparatively large amount of heat generated. In some cases if minute living material, such as bacteria, is exposed to heat generated by the incandescent lamp, it dies very quickly. Also the light generated by the incandescent lamp is chiefly in the red region of the spectral range of light. Because of this fact, its color rendition is poor and some specimens under such light may present little or no contrast under bright field microscopic examination.

The present invention aims to overcome the foregoing difficulties and disadvantages of prior constructions by providing a modeling light source which is of the proper color and exact focus of the high power flash from the flash tube.

In accordance with the invention this is accomplished by providing an electrical system in which the same flash tube may be repetitively flashed for modeling and singly flashed for taking a photograph.

In accordance with another aspect of the invention an adapter unit is provided for converting existing single flash equipment to alternative single or multiple flash.

The construction of the present invention provides means for repetitiously flashing the gaseous discharge tube at a rate which provides a flashing light effective essentially as a continuous burning light source although the rate may be varied if desired.

Among the advantages of the construction in accordance with the invention is that an extremely accurate adjustment of the light is possible as the modeling or viewing light has exactly the same light center and common axis as the high intensity flash. Furthermore, such a light produces much less heat than an incandescent lamp and the color quality is more satisfactory for the purpose.

Another object of the invention is to provide an electrical system producing either single or multiple light flashes from the same discharge device.

Still another object of the invention is to provide an adapter unit to convert a single flash unit to either single or multiple flash.

A further object of the invention is to provide an electrical system for either single or multiple flash which is simple and economical in manufacture, efcient in operation and rugged in use.

In the drawings:

Figure 1 is a drawing of an electrical system conventionally used for the production of single high intensity flashes.

Figure 2 is a drawing of an electrical system in accordance with the invention which will produce either single or multiple flashes, a portion of this drawing being set out by dashed lines including the elements of an adapter circuit which might be interposed in the conventional single flash unit of Figure 1.

Referring to the drawings, there is shown in Figure 1 a single flash circuit which includes generally a power supply, a triggering circuit and a flash tube.

The power supply is adapted to be connected to an alternating source of electricity by a conventional connection plug 1. A step-up transformer 2 includes a primary winding 3 and a secondary winding 4. The primary winding 3 is connected to the connection plug 1 on one side by a wire 5 and on the other side by a wire 6 through a protection fuse 7. In order to indicate the availability of the electrical current, an indicator lamp 9 in series with the resistance 10 may be connected across the primary of the transformer. The high voltage secondary of the transformer 4 is grounded at one side as indicated at 11 while the other side 12 is connected to the junction of a pair of selenium rectifiers 14 and 15, the output of the selenium rectifiers 14 and 15 being connected to capacitors 16 and 17 in a doubling circuit. Intermediate point 19 of the capacitors 16 and 17 is connected by wire 19 to ground. The output of rectifier 14 is connected to capacitor 16 by a wire 21 while the output of rectifier 15 is connected to the capacitor 17 by a wire 22. The circuit so far described provides a high voltage source of electricity across the outer terminals of the doubling circuit available at the wires 21 and 22.

The triggering circuit including cold cathode thyratron triggering tube 24 has its plate or anode 25 grounded through a wire 26 and has its cathode 27 connected through a resistance 29 to the negative side of the high voltage supply by a wire 30. In order to prevent flash holdover of the triggering tube 24, a condenser or capacitor 31 is connected from the cathode 27 by a wire 32 and to ground by a wire 34.

Grid 35 is connected by a wire 36 through a grid resistance 37 and a wire 39 to ground for the purpose of providing a "keep alive" current in the tube 24. The actual triggering of the tube 24 is accomplished by the grid 41 connected to the midpoint 42 of a resistance 44 and a capacitor 45. The resistance 44 is connected by a wire 46 to the cathode 27 while the capacitor 45 is connected by a wire 47 to the junction of a resistance 49 and one pole of a triggering switch 50, the other pole of the triggering switch 50 being connected by a wire 51 to ground. A pair of dividing resistors 52 and 54 are connected in series, the junction 55 being connected to the end of resistor 49; the other side of resistor 54 is connected to ground by a wire 56 while the remaining side of resistor 52 is connected by wire 57 to the high voltage supply wire 30. The description of the trigger circuit is completed by the provision of a wire 59 from the cathode 27 to a contact 60 which may be one of the contacts of a disconnecting jack. Another contact of the disconnecting plug may be a disconnecting contact 61 to which is connected the high voltage lead 30, and a third contact of the disconnecting plug may be the disconnecting contact 62 connected to the high voltage supply wire 22 by means of a wire 64. The disconnecting plug is not shown on the drawing, only the contacts 60, 61 and 62 being shown. However, if a disconnecting plug is used, it must necessarily include a pair of grounding contacts.

In order to provide ease of manipulation, the flash tube is ordinarily connected to the power supply and triggering circuit by means of a multiconnector flexible cord, generally terminating in a disconnecting plug having contacts corresponding to contacts 60, 61, and 62 which may be indicated respectively as 65, 66, and 67. Gas-filled flash tube 70 has its cathode 71 connected by a wire 72 to the contact 66 while its plate or anode 74 is connected by a wire 75 to contact 67. Triggering electrode 76 of the tube 74 is connected to the secondary 77 of a high voltage triggering pulse transformer, the other side of the secondary being grounded through wire 80. Primary 81 of the triggering transformer has one side grounded and its other side connected by a wire 82 to a triggering capacitor 84 which has its other side connected by a wire 85 to the contact 65.

So far described the circuit is that of the conventional single flash unit.

The operation of the single flash unit is caused by the closing of the switch 50 which may be done at the same time and in synchronism with the operation of a camera shutter or any other device with which the flash may be used. The light flash is caused by the discharge of the capacitors 16 and 17 through or across the electrodes 71 and 74 through the flash tube 70. The capacitors are charged by current passing through the transformer 2 which is thereby raised to the desired potential, the rectifiers 14 and 15 converting the high voltage alternating current electricity to direct current electricity for the charging of the capacitors 16 and 17. The actual triggering of the flash tube 40 is caused by a high voltage ionizing pulse in the secondary 77 of the triggering transformer which in cooperation with the trigger electrode 76 ionizes the flash tube 70 causing the stored energy in the capacitors 16 and 17 to flow between the electrodes 71 and 74, thereby producing a predetermined high intensity flash of light. The action of the triggering circuit in which the switch 50 is closed to cause the flash is started by the discharge of the condenser 45 across the grid 41 and plate 25 of the triggering tube 24, thereby triggering the tube for a flash between the plate 25 and the cathode 27 of the tube 24. This breakdown of the tube resistance causes a discharge of the triggering transformer capacitor 84 through the primary 81 of the triggering transformer, thereby inducing the current in the secondary of the triggering transformer actuating the flash. In assisting the initial breakdown of the tube 24, the "keep alive" current is produced by the resistance 37 which thereby draws a slight current through the tube from the cathode 27, making the tube ready for instant triggering upon the closing of the switch 50. In order to prevent self-flashing of the tube 24 the condenser 31 is connected from the cathode 27 to ground. This part of the circuit is only effective in the event the flash tube 70 is disconnected from the circuit together with the condenser 84 in which event an inadvertent closing of the switch 50 would cause the tube 24 to breakdown and continuously conduct with the resulting possible damage thereto. Such an inadvertent mishap is prevented by the condenser 31 which momentarily draws sufficient current to depress the potential of the cathode 27 for a sufficient time for the tube to deionize. In order to prevent damage to the switch contact 50, the current limiting resistor 49 is connected to the midpoint of the resistors 52 and 54, thereby limiting the current which could flow from the midpoint 55 to ground and thereby only allowing the small charge on the condenser 45 to pass through the switch contact 50. The tube 24 is further protected by the current limiting resistor 29 so that upon breakdown of the tube 24, the current supplied from the high voltage wire 30 is limited in magnitude.

In accordance with the invention a circuit is provided in which the flash tube 70 may be either singly or repetitiously flashed. Referring to Figure 2 in which corresponding numerals are used as in Figure 1 with the addition of one hundred, there is shown a power supply, a triggering circuit and a flash tube. Additionally, there is provided means for rendering ineffective the single flash discharge and producing a repetitious flashing discharge of the flash tube 170. The circuit of Figure 2 is exactly the same as that in Figure 1 up to the disconnecting contacts 160—162. An additional control circuit is included and interposed ahead of the disconnecting contacts 165—167. The additional circuit includes a double pole, double throw switch 200 having an intermediate standby position. One set of the contacts of the switch 200 is indicated by the numeral 201 while the other set is indicated by the numeral 202, the sets 201 and 202 being similar in that they have coupled swingers respectively designated 201a and 202a. Swinger 201a is adapted to successively engage contacts 201b, 201c and 201d while simultaneously swinger 202a is adapted to successively engage contacts 202b, 202c and 202d. When the swingers are in contact with the "b" position, the circuit is set for "repetitious" flashing; when engaging the "c" contact, the unit is in "standby"; and when engaging "d" contacts, the unit is ready for a full power single flash. The control of the "repetitious" flash is based in a cold cathode triggering tube 204 having a plate or anode 205 and a cathode 206. Dual grids 207 and 209 nearest the cathode 206 are connected together as indicated at 210, while the third grid 211 is free of connections. The anode 205 is grounded by a wire 212 while the cathode 206 is connected by a wire 214 to one side of a current limiting resistor 215, the other side of the resistor 215 being connected by a wire 216 to a junction point 217 connected by a wire 218 to a disconnecting contact 219 adapted to contact the disconnecting contact 161. The junction point 217 is connected by wire 220 to the swinger 201a of the switch 200. Contact 201b is connected by a wire 221 to a variable resistor 222 connected by a wire 224 in series with a resistor 225 connected by a wire 226 with the cathode 206. Contact 201c is free of connections. Contact 201d is connected by a wire 227 with a high voltage wire 228 connected to one side of a current limiting resistor 229, the other side of the current limting resistor 229 being connected to the junction 220 by a wire 230. The high voltage wire 228 terminates in a disconnecting contact 231 adapted to engage the disconnecting contact 166. The tie point 210 of the grids 207 and 209 is connected by a wire 232 to the junction point 234 of three resistors respectively indicated by the numerals 235, 236, and 237. Resistors 235 and 237 form a potential divider, the free end of resistor 235 being connected to the wire 214 while the free end of the resistor 237 is grounded. The free end of resistor 236 is connected to one terminal of a triggering switch 240, the other terminal being connected to ground by a wire 241. The second side or set of contacts of the switch 202 and the circuit involved therewith might be dispensed with in the event the main capacitor unit is of the half wave type rather than the doubling circuit as shown. In the circuit as shown swinger 202a is connected by a wire 242 to a junction point 244 connected by a wire 245 to a disconnecting contact 246 adapted to engage the disconnecting contact 162. The junction point 244 is connected by a wire 247 to one side of a current limiting resistance 249, the other side of which is connected to a junction point 250. No connections are made to contacts 202b or 202c. Contact 202d is connected by a wire 251 to the junction point 250 which is connected by a wire 251 to a disconnecting contact 252 adapted ot engage the disconnecting contact 167.

In order to provide repetitive flashes, an additional flashing capacitance 254 is provided, the capacity of which is predetermined in magnitude and is less than that of the main capacitor unit 116 and 117. Depending upon the magnitude of the desired flash, the size of the flashing capacitance is selected. The flashing capacitor 254 may be a single unit connected across the high voltage supply lines 228 and 251 or it may be a common ground double condenser as shown including capacitor 255 and 256 connected to a common point 257 which may be grounded through a wire 259. The other side of capacitor 256 is connected by a wire 260 to high voltage wire 228 and the other side of capacitor 255 is connected by a wire 261 to the other high voltage wire 251. In order to connect to the triggering transformer circuit, a wire 262 is connected from the cathode 206 to a disconnecting contact 264 adapted to engage the disconnecting contact 165. The operation of the circuit in accordance with the invention may be either for single or repetitious flashing. Assuming the circuit is used in a photographic lamp circuit and it is desired to accurately position the flash lamp 70, it is preferable that the unit be operated at repetitious flash in which event the gang switch 201 is positioned to the "b" contacts. With the circuit in this position, the resistances 229 and 249 are connected in the high voltage line circuits so as to prevent or limit the discharge from the main capacitors 116 and 117 through the flash tube 170.

When adapted to engage a source of power with the swinger 201a in the "b" position, the flash lamp 170 will immediately start to flash repetitiously, the number of flashes per second depending upon the position of the variable resistor 222. By proper selection of the system components, it is possible to construct a circuit in which the rate of flash will vary from less than two flashes per second to 120 flashes per second or more. In commercial design it is generally found that there is little requirement for less than two flashes per second and a practically continuously burning light is obtained with flashes of over sixty per second. The repetitious flash is obtained in the diagram as shown by employing a gaseous discharge tube connected in a relaxation oscillator circuit, the circuit as shown being termed a cathode relaxation oscillator circuit. The oscillatory circuit is comprised of the primary 181 of the triggering transformer, the triggering condenser 184, and the resistance combination 225 and 222, the resistance 222 being variable to affect the RC characteristic of the circuit. A constant bias is provided for the tube 204 by the resistance divider including the resistances 235 and 237. The resistance 215 is used to provide isolation between the charge on the main condensers 116 and 117 and to provide isolation from the charge on the flashing condensers 254 and 255 so that neither of these condensers will discharge through the tube 204, and at the same time provide a lower potential for the cathode.

The action of the relaxation oscillator circuit in Figure 2 is similar in effect to that had by the closing of the switch 50 in Figure 1 in that if the relaxation circuit oscillates, the condenser 184 is repetitiously discharged at a regular rate depending upon the setting of the resistance 222 thereby affecting the characteristics of the RC circuit. The periodic discharge of the condenser 184 through the tube 204 and the primary 181 of the triggering transformer produces pulses in the ionizing grid or electrode 176 causing the tube 170 to flash powered by the charges on the capacitors 255 and 256. The purpose in providing the flashing condensers 255 and 256 for the repetitive flash is to provide discharge energy in low quantities through the tube 170 of a magnitude sufficient for visual observation of the article being illuminated over an appreciable period of time without overloading the tube 170 as would be the case if the discharge were of the magnitude provided by the main condensers 116 and 117. In cases depending upon the characteristics of the power supply and size of the main capacitor, a certain amount of stored energy is provided for the recharging of the flashing capacitors 255 and 256 through the resistances 229 and 249 which makes it possible for the power supply to be somewhat lower in capacity than would be otherwise required for the charging of the pulsing capacitor. In the operation of the circuit of Figure 2 for single flash, the switch 202 is placed in the "d" position, thereby shorting out the resistances 229 and 249 so that the full charge of the main capacitors 116 and 117 is discharged through the tube 170. However, by changing the switch 202 from the "b" position to the "d" position, the relaxation oscillator circuit through the resistances 222 and 225 is opened, thereby raising the potential on the cathode 206 so that there is no repetitive flashing. In order to achieve a single flash, the switch 240 is then closed raising the grid voltage on the tube 206 causing flashover and discharge of the triggering transformer 184 causing the discharge of the main condensers 116 and 117 as well as the condensers 255 and 256 through the flash tube 170.

A characteristic set of values for the components of the circuits of Figures 1 and 2 is as follows:

| | |
|---|---|
| 16, 116 | } 525 mfd. |
| 17, 117 | |
| 24, 124 | 6483. |
| 29, 129 | .1 meg. |
| 31, 131 | 0.01 mfd. |
| 37, 137 | 10 meg. |
| 44, 144 | 5.1 meg. |
| 45, 145 | 0.01 mfd. |
| 52, 152 | 2.7 meg. |
| 54, 154 | 5.1 meg. |
| 56, 156 | 5.1 meg. |
| 70, 170 | FT-221. |
| 81-82, 181-182 | Triggering transformer as Modelelectric type "LL." |
| 84, 184 | .1 mf. |
| 204 | SN4. |
| 215 | 9.1M. |
| 222 | 5M, potentiometer. |
| 225 | 56K. |
| 229 | 2K. |
| 235 | 5.6M. |
| 236 | 2.2M. |
| 237 | 6.8M. |
| 249 | 2K. |
| 255 | 1 mfd. |
| 256 | 1 mfd. |

It is obvious from the foregoing description that the circuit of Figure 2, the parts of which are identified by numbers starting in the two hundred series, may be provided separately as an adapter unit to modify an already existing unit as shown in Figure 1 for either single or repetitive flashing. This is accomplished by opening the disconnecting contacts 61—62 and connecting therein the contacts 219 and 246 of the adapter unit and connecting the disconnecting contacts 65–67 of Figure 1 to the disconnecting contacts 231, 264 and 252.

While the invention has been described and illustrated with reference to a specific embodiment thereof, it will be understood that other embodiments may be resorted to without departing from the invention. For example, the relaxation oscillator circuit of Figure 2 might be replaced by a separately powered battery gas tube circuit connected with the triggering transformer for the oscillation thereof. Likewise, an alternative construction might be made up utilizing a mechanical switch device substituted for the relaxation oscillator circuit for pulsing discharge of the triggering transformer at the predetermined rate desired. Therefore, the form of the invention set out above should be considered as illustrative and not as limiting the scope of the following claims.

We claim:

1. An electrical control circuit for an electrical system including a main condenser, a discharge device and a discharge circuit through which the main condenser may be discharged into the discharge device in single pulses, said discharge means including a triggering circuit and a triggering condenser, a control circuit operative so that the discharge device may be selectively discharged in single or repetitive pulses, the control circuit comprising current limiting means adapted to be connected in series with the main condenser, a pulsing condenser connected to the discharge device, means adapted to be connected to the triggering condenser and oscillatory therewith for the repetitive charging and discharging thereof, means operative to render ineffective the current limiting means for the main condenser and said oscillating means, and means adapted to be connected to and operative to discharge said triggering condenser.

2. A light flash producing system comprising a flash tube, a main capacitor for high capacity discharge of said flash tube, a pulsing capacitor connected across the flash tube for low capacity flashing thereof, triggering means to actuate the flash tube, current limiting means connected in series between the main capacitor and the flash tube, oscillatory circuit means including the triggering means, means connecting the oscillatory circuit means to the main capacitor, means operative to render the oscillatory circuit means ineffective, and means to render ineffective the current limiting means, whereby, alternatively, repetitive low capacity flashing of the flash tube may be had by the pulsing capacitor, or single high capacity flashing of the flash tube may be had by the main condenser.

3. A repetitive light flash producing system comprising a flash tube, a main capacitor, a pulsing capacitor connected across the flash tube, current limiting means connected in series between the main capacitor and the flash tube, triggering means to actuate the flash tube including a triggering capacitor in series with a triggering transformer, and a gas-discharge tube connected across the triggering capacitor and triggering transformer to form an oscillatory circuit therewith to produce repetitive pulses in the triggering transformer for the repetitive actuation of the flash tube.

4. A repetitive light flash producing system comprising a flash tube, a main capacitor, a pulsing capacitor directly connected across the flash tube, current limiting means connected in series between the main capacitor and the flash tube, a triggering transformer, a triggering capacitor, a gas-discharge tube, the triggering transformer and the triggering capacitor connected in series across the tube to form an oscillatory circuit, and a variable resistor connected in series between the main capacitor and the tube to vary the potential to the oscillatory circuit so as to vary its rate of oscillation, whereby a variable rate of repetitive pulses may be produced in the triggering transformer for the repetitive actuation of the flash tube.

5. An adaptor for use with single light flash apparatus normally including a main capacitor, a flash tube, a triggering transformer for the flash tube, and a triggering capacitor for the triggering transformer, the adaptor for use with said single flash apparatus for producing repetitive flashing thereof, the adaptor comprising a pulsing transformer to be connected directly across the flash tube, a current limiting means to be connected in series between the main capacitor and the flash tube, and a gas-discharge tube to be connected in parallel with the triggering capacitor and the triggering transformer to form an oscillatory circuit to produce repetitive current pulses in the triggering transformer, whereby the flash tube is repetitively flashed.

6. An adaptor for use with single light flash apparatus normally including a main capacitor, a flash tube, a triggering transformer for the flash tube, and a triggering capacitor for the triggering transformer, the adaptor for use with said single flash apparatus for producing repetitive flashing thereof, the adaptor comprising a pulsing transformer to be connected directly across the flash tube, a current limiting means to be connected in series between the main capacitor and the flash tube, a gas-discharge tube to be connected in parallel with the triggering capacitor and the triggering transformer to form an oscillatory circuit to produce repetitive current pulses in the triggering transformer, and a variable resistor connected in series between the main capacitor and the oscillatory circuit to vary the potential to the tube so as to vary the rate of oscillation, whereby the flash tube is repetitively flashed in a variable manner.

References Cited in the file of this patent

UNITED STATES PATENTS

| 1,979,692 | Knowles | Nov. 6, 1934 |
| 2,331,317 | Germeshausen | Oct. 12, 1943 |
| 2,478,905 | Edgerton | Aug. 16, 1949 |
| 2,622,229 | Lord | Dec. 16, 1952 |